(No Model.)

T. C. RICE.
FIRE EXTINGUISHER.

No. 402,970. Patented May 7, 1889.

WITNESSES
A. H. Barker
W. B. Nourse.

Thomas C. Rice INVENTOR,

BY Jas. G. Arnold
ATTORNEY

UNITED STATES PATENT OFFICE.

THOMAS C. RICE, OF WORCESTER, MASSACHUSETTS.

FIRE-EXTINGUISHER.

SPECIFICATION forming part of Letters Patent No. 402,970, dated May 7, 1889.

Application filed January 23, 1889. Serial No. 297,228. (No model.)

*To all whom it may concern:*

Be it known that I, THOMAS C. RICE, residing in the city and county of Worcester, State of Massachusetts, have invented a new and useful Fire-Extinguishing Vessel, of which the following is a specification.

My invention relates, mainly, to protecting the insides of vessels used in fire-extinguishing apparatus in which acids, alkalies, or their compounds are used, which would otherwise injure said vessels, and also to constructing a fire-extinguishing utensil composed of such protected vessel containing an acidulated liquid and provided with a receptacle holding other elements to be mixed therewith to put on the fire. Its nature is fully shown in the following description and accompanying drawings of a fire-bucket embodying my invention.

Figure 1:
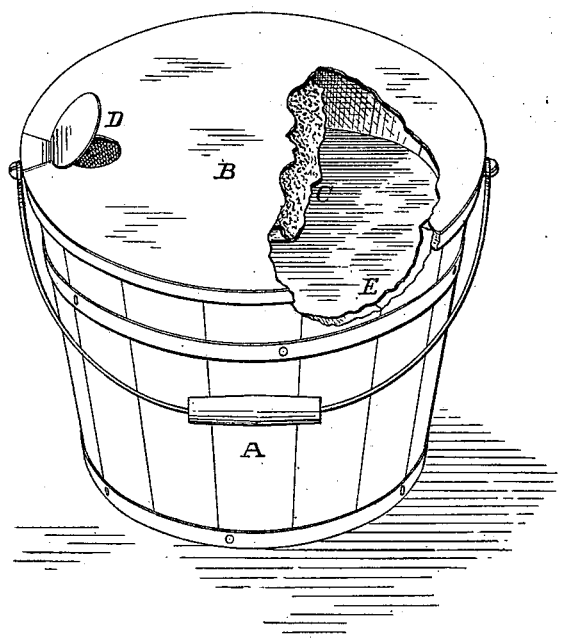
Figure 2:
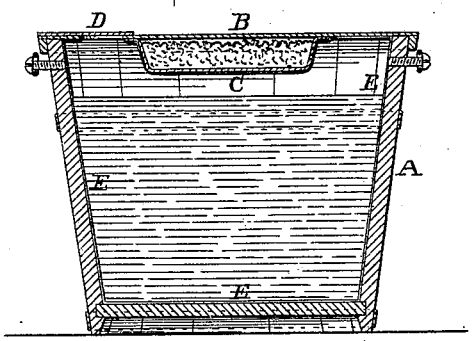

In said drawings, Figure 1 is a perspective view of a fire-bucket as charged and sealed ready for use, a portion of the top shown as removed to show the interior construction. Fig. 2 shows a central vertical section of the same.

The body of the vessel A may be in form and construction like a water-pail, with a handle or bail, as shown, having its edge at the top flat to receive a layer of bitumen or asphalt, with which all the interior of the body A and its top B is lined and protected from the action of the acidulated liquid to be held in the vessel. The double lines E E indicate the protecting-lining.

At D is shown a hole, with its valve-like cover open in Fig. 1 and closed in Fig. 2, as when sealed. This opening is to allow the liquid to be put in after the top B is sealed in place, which is done by passing a hot iron round the edge on top warm enough to melt the bitumen on the edge of A. This hermetically seals them together, so that when the valve at D is sealed in a similar manner the whole is tight, and all loss by evaporation prevented.

Attached to the top B (and preferably to the under side of it) is a receptacle, C, made, as is the top B, of thick paper, or any material easily broken, so that the contents of the receptacle C shall be allowed to fall into the liquid below for use. The form and construction of these parts may be varied considerably, the essential parts being the vessel A, having a cover easily broken, hermetically sealed thereto by bitumen and provided with a receptacle (or otherwise holding the chemical that is by the breaking of the cover to be dropped into the liquid below) all lined with bitumen.

The fire-bucket is charged by nearly filling the body A, as shown, with one part of sulphuric acid of commerce and about eighty of water, the receptacle C having been filled with a suitable portion of chemical, as bicarbonate of soda, or other carbonate, before it is sealed to the top B, and when the valve at D is sealed down the bucket remains ready for use. To use it, the top B is broken in allowing the chemical in the receptacle C to sift down into the liquid, and the desired carbonic acid is rapidly evolved in great quantities to be applied to extinguish the fire, with or without the liquid in the bucket.

I am aware that fire-extinguishers have been provided with a chemical-holding bottle or jar adapted to be broken to liberate the chemicals and permit them to commingle with acidulated water to generate carbonic-acid gas, and to this idea I make no broad claim; neither do I wish to be understood as claiming, broadly, the use of tar as a waterproofing agent, as I am aware that this has been long in use.

I claim—

1. A portable fire-extinguishing pail or vessel provided with a frangible cover and with a pocket in said cover.

2. As an improved article of manufacture, a portable fire-extinguishing pail or vessel provided with an internal protecting coating and a frangible cover provided with a pocket.

3. In a fire-extinguisher, the combination, with a pail or vessel coated on its interior, of a paper cover coated on its under side for protection against the contents of the vessel, and a pocket formed in said cover.

4. In combination with a portable pail or vessel, a frangible cover for the same provided with a pocket and with an opening, and a valve adapted to close the opening.

5. In combination with a pail or vessel having a bituminous internal coating, a paper cover for said pail or vessel, also coated on its under face, and a pocket formed in said cover, all substantially as shown.

THOMAS C. RICE.

Witnesses:
C. H. ARNOLD,
J. G. ARNOLD.